US008959298B2

(12) United States Patent
Chun et al.

(10) Patent No.: US 8,959,298 B2
(45) Date of Patent: Feb. 17, 2015

(54) SYSTEM AND METHOD FOR MANAGING PERFORMANCE OF A COMPUTING DEVICE HAVING DISSIMILAR MEMORY TYPES

(71) Applicant: QUALCOMM Incorporated, San Diego, CA (US)

(72) Inventors: Dexter T. Chun, San Diego, CA (US); Serag Gadelrab, Ontario (CA); Stephen Molloy, San Diego, CA (US); Thomas Zeng, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 164 days.

(21) Appl. No.: 13/726,537

(22) Filed: Dec. 24, 2012

(65) Prior Publication Data

US 2014/0164689 A1    Jun. 12, 2014

Related U.S. Application Data

(60) Provisional application No. 61/735,352, filed on Dec. 10, 2012.

(51) Int. Cl.
*G06F 12/00* (2006.01)
*G06F 12/06* (2006.01)
*G06F 13/16* (2006.01)

(52) U.S. Cl.
CPC ........ *G06F 12/0607* (2013.01); *G06F 13/1647* (2013.01); *G06F 13/1694* (2013.01)
USPC ........... 711/157; 711/105; 711/147; 711/148; 711/170

(58) Field of Classification Search
None
See application file for complete search history.

(56) References Cited

U.S. PATENT DOCUMENTS

| | | | |
|---|---|---|---|
| 7,620,793 B1* | 11/2009 | Edmondson et al. | ......... 711/208 |
| 7,768,518 B2 | 8/2010 | Collins et al. | |
| 8,194,085 B2 | 6/2012 | Greco et al. | |
| 8,289,333 B2 | 10/2012 | Schreyer et al. | |
| 8,314,807 B2 | 11/2012 | Biswas et al. | |
| 2004/0260864 A1 | 12/2004 | Lee et al. | |
| 2005/0235124 A1 | 10/2005 | Pomaranski et al. | |
| 2007/0180203 A1 | 8/2007 | Ramgarajan et al. | |
| 2008/0016308 A1 | 1/2008 | Bartley et al. | |
| 2008/0250212 A1 | 10/2008 | Asaro et al. | |

(Continued)

FOREIGN PATENT DOCUMENTS

| | | |
|---|---|---|
| EP | 1591897 | 11/2005 |
| WO | WO-9004576 A2 | 5/1990 |

OTHER PUBLICATIONS

International Search Report and Written Opinion—PCT/US2013/067843—ISA/EPO—Jan. 31, 2014.

(Continued)

*Primary Examiner* — Shawn X Gu
(74) *Attorney, Agent, or Firm* — Nicholas A. Cole

(57) ABSTRACT

Systems and methods are provided for managing performance of a computing device having dissimilar memory types. An exemplary embodiment comprises a method for interleaving dissimilar memory devices. The method involves determining an interleave bandwidth ratio comprising a ratio of bandwidths for two or more dissimilar memory devices. The dissimilar memory devices are interleaved according to the interleave bandwidth ratio. Memory address requests are distributed from one or more processing units to the dissimilar memory devices according to the interleave bandwidth ratio.

25 Claims, 8 Drawing Sheets

(56) References Cited

U.S. PATENT DOCUMENTS

| | | |
|---|---|---|
| 2009/0150710 A1 | 6/2009 | Bilger et al. |
| 2009/0228631 A1 | 9/2009 | Marulkar et al. |
| 2010/0118041 A1 | 5/2010 | Chen et al. |
| 2010/0321397 A1 | 12/2010 | Ginzburg |
| 2011/0154104 A1 | 6/2011 | Swanson et al. |
| 2011/0157195 A1 | 6/2011 | Sprangle et al. |
| 2011/0320751 A1 | 12/2011 | Wang et al. |
| 2012/0054455 A1 | 3/2012 | Wang et al. |
| 2012/0155160 A1 | 6/2012 | Alam et al. |
| 2012/0162237 A1 | 6/2012 | Chung |
| 2012/0331226 A1 | 12/2012 | Krishnan et al. |
| 2014/0101379 A1* | 4/2014 | Tomlin .................... 711/103 |
| 2014/0164690 A1 | 6/2014 | Subrato et al. |
| 2014/0164720 A1 | 6/2014 | Stewart et al. |

OTHER PUBLICATIONS

Li J., et al., "An Optimized Large-Scale Hybrid DGEMM Design for CPUs and ATI GPUs," ICS '2012 Proceedings of the 26th ACM international conference on Supercomputing, 2012, pp. 377-386.

Texas Instruments, "DaVinci Digital Video Processor—datasheet", Texas Instruments, SPRS614D Mar. 2011. Revised Jan. 2013, pp. 151-327.

* cited by examiner

| ADDRESS BLOCK | INTERLEAVE BANDWIDTH RATIO | | |
| --- | --- | --- | --- |
| | 1:1 | 2:1 | 1:2 |
| N | wideio2 | wideio2 | wideio2 |
| N + 1 | lpddr3e | wideio2 | lpddr3e |
| N + 2 | wideio2 | lpddr3e | lpddr3e |
| N + 3 | lpddr3e | wideio2 | wideio2 |
| N + 4 | wideio2 | wideio2 | lpddr3e |
| N + 5 | lpddr3e | lpddr3e | lpddr3e |
| N + 6 | wideio2 | wideio2 | wideio2 |

FIG. 5

SYSTEM AND METHOD FOR MANAGING PERFORMANCE OF A COMPUTING DEVICE HAVING DISSIMILAR MEMORY TYPES

PRIORITY AND RELATED APPLICATIONS STATEMENT

This application claims priority under 35 U.S.C. 119(e) to U.S. Provisional Patent Application filed on Dec. 10, 2012, assigned Provisional Application Ser. No. 61/735,352, and entitled "System and Method for Managing Performance of a Computing Device Having Dissimilar Memory Types," the entire contents of which is hereby incorporated by reference.

DESCRIPTION OF THE RELATED ART

System performance and power requirements are becoming increasingly demanding in computer systems and devices, particularly in portable computing devices (PCDs), such as cellular telephones, portable digital assistants (PDAs), portable game consoles, palmtop computers, tablet computers, and other portable electronic devices. Such devices may comprise two or more types of processing units optimized for a specific purpose. For example, one or more central processing units (CPUs) may used for general system-level performance or other purposes, while a graphics processing unit (GPU) may be specifically designed for manipulating computer graphics for output to a display device. As each processor requires more performance, there is a need for faster and more specialized memory devices designed to enable the particular purpose(s) of each processor. Memory architectures are typically optimized for a specific application. CPUs may require high-density memory with an acceptable system-level performance, while GPUs may require relatively lower-density memory with a substantially higher performance than CPUs.

As a result, a single computer device, such as a PCD, may include two or more dissimilar memory devices with each specialized memory device optimized for its special purpose and paired with and dedicated to a specific processing unit. In this conventional architecture (referred to as a "discrete" architecture), each dedicated processing unit is physically coupled to a different type of memory device via a plurality of physical/control layers each with a corresponding memory channel. Each dedicated processing unit physically accesses the corresponding memory device at a different data rate optimized for its intended purpose. For example, in one exemplary configuration, a general purpose CPU may physically access a first type of dynamic random access memory (DRAM) device at an optimized data bandwidth (e.g., 17 Gb/s). A higher-performance, dedicated GPU may physically access a second type of DRAM device at a higher data bandwidth (e.g., 34 Gb/s). While the discrete architecture individually optimizes the performance of the CPU and the GPU, there are a number of significant disadvantages.

To obtain the higher performance, the GPU-dedicated memory must be sized and configured to handle all potential use cases, display resolutions, and system settings. Furthermore, the higher performance is "localized" because only the GPU is able to physically access the GPU-dedicated memory at the higher data bandwidth. While the CPU can access the GPU-dedicated memory and the GPU can access the CPU-dedicated memory, the discrete architecture provides this access via a physical interconnect bus (e.g., a Peripheral Component Interconnect Express (PCIE)) between the GPU and the CPU at a reduced data bandwidth, which is typically less than the optimized bandwidth for either type of memory device. Even if the physical interconnect bus between the GPU and the CPU did not function as a performance "bottleneck", the discrete architecture does not permit either the GPU or the CPU to take advantage of the combined total available bandwidth of the two different types of memory devices. The memory spaces of the respective memory devices are placed in separate contiguous blocks of memory addresses. In other words, the entire memory map places the first type of memory device in one contiguous block and separately places the second type of memory device in a different contiguous block. There is no hardware coordination between the memory ports of the different memory devices to support physical access residing within the same contiguous block.

Accordingly, while there is an increasing demand for more specialized memory devices in computer systems to provide increasingly more system and power performance in computer devices, there remains a need in the art for improved systems and methods for managing dissimilar memory devices.

SUMMARY OF THE DISCLOSURE

Systems and methods are provided for managing performance of a computing device having dissimilar memory types. An exemplary embodiment comprises a method for interleaving dissimilar memory devices. The method involves determining an interleave bandwidth ratio comprising a ratio of bandwidths for two or more dissimilar memory devices. The dissimilar memory devices are interleaved according to the interleave bandwidth ratio. Memory address requests are distributed from one or more processing units to the dissimilar memory devices according to the interleave bandwidth ratio.

BRIEF DESCRIPTION OF THE DRAWINGS

In the Figures, like reference numerals refer to like parts throughout the various views unless otherwise indicated. For reference numerals with letter character designations such as "102A" or "102B", the letter character designations may differentiate two like parts or elements present in the same Figure. Letter character designations for reference numerals may be omitted when it is intended that a reference numeral to encompass all parts having the same reference numeral in all Figures.

FIG. 5 is an exemplary table illustrating a memory channel address remapping based on various interleave bandwidth ratios.

DETAILED DESCRIPTION

The word "exemplary" is used herein to mean "serving as an example, instance, or illustration." Any aspect described herein as "exemplary" is not necessarily to be construed as preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

The term "content" may also include files having executable content, such as: object code, scripts, byte code, markup language files, and patches. In addition, "content" referred to herein, may also include files that are not executable in nature, such as documents that may need to be opened or other data files that need to be accessed.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In this description, the terms "communication device," "wireless device," "wireless telephone", "wireless communication device," and "wireless handset" are used interchangeably. With the advent of third generation ("3G") wireless technology and four generation ("4G"), greater bandwidth availability has enabled more portable computing devices with a greater variety of wireless capabilities. Therefore, a portable computing device may include a cellular telephone, a pager, a PDA, a smartphone, a navigation device, or a hand-held computer with a wireless connection or link.

Figure 1:
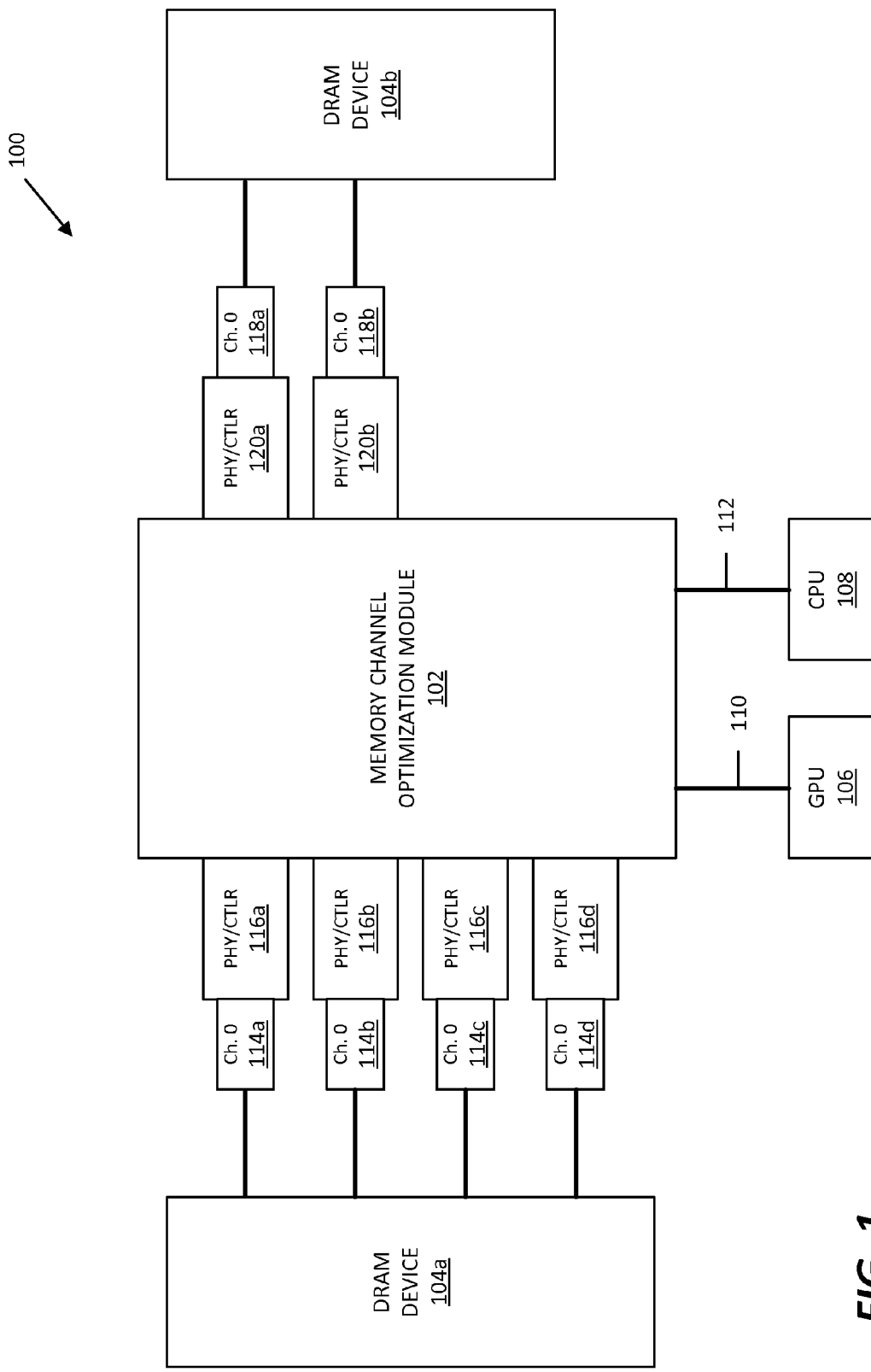
FIG. 1 is a block diagram of an embodiment of system for managing dissimilar memory devices.

FIG. 1 illustrates a system 100 comprising a memory management architecture that may be implemented in any suitable computing device having two or more dedicated processing units for accessing two or more memory devices of different types, or similar types of memory devices having different data bandwidths (referred to as "dissimilar memory devices"). The computing device may comprise a personal computer, a workstation, a server, a portable computing device (PCD), such as a cellular telephone, a portable digital assistant (PDA), a portable game console, a palmtop computers, or a tablet computer, and any other computing device with two or more dissimilar memory devices. As described below in more detail, the memory management architecture is configured to selectively provide two modes of operation: a unified mode and a discrete mode. In the discrete mode, the memory management architecture operates as a "discrete architecture" in the conventional manner as described above, in which each dedicated processing unit accesses a corresponding memory device optimized for its intended purpose. For example, a dedicated general purpose central processing unit (CPU) may access a first type of memory device at an optimized data bandwidth, and a higher-performance, dedicated graphics processing unit (GPU) may access a second type of memory device at a higher data bandwidth. In the unified mode, the memory management architecture is configured to unify the dissimilar memory devices and enable the dedicated processing units to selectively access, either individually or in combination, the combined bandwidth of the dissimilar memory devices or portions thereof.

As illustrated in the embodiment of FIG. 1, the system 100 comprises a memory channel optimization module 102 electrically connected to two different types of dynamic random access memory (DRAM) devices 104a and 104b and two or more dedicated processing units (e.g., a CPU 108 and a GPU 106) that may access the DRAM devices 104a and 104b. GPU 106 is coupled to the memory channel optimization module 102 via an electrical connection 110. CPU 108 is coupled to the memory channel optimization module 102 via an electrical connection 112. The memory channel optimization module 102 further comprises a plurality of hardware connections for coupling to DRAM devices 104a and 104b. The hardware connections may vary depending on the type of memory device. In the example of FIG. 1, DRAM 104a supports four channels 114a, 114b, 114c, and 114d that connect to physical/control connections 116a, 116b, 116c, and 116d, respectively. DRAM 104b supports two channels 118a and 118b that connect to physical/control connections 120a and 120b, respectively. It should be appreciated that the number and configuration of the physical/control connections may vary depending on the type of memory device, including the size of the memory addresses (e.g., 32-bit, 64-bit, etc.).

Figure 2:
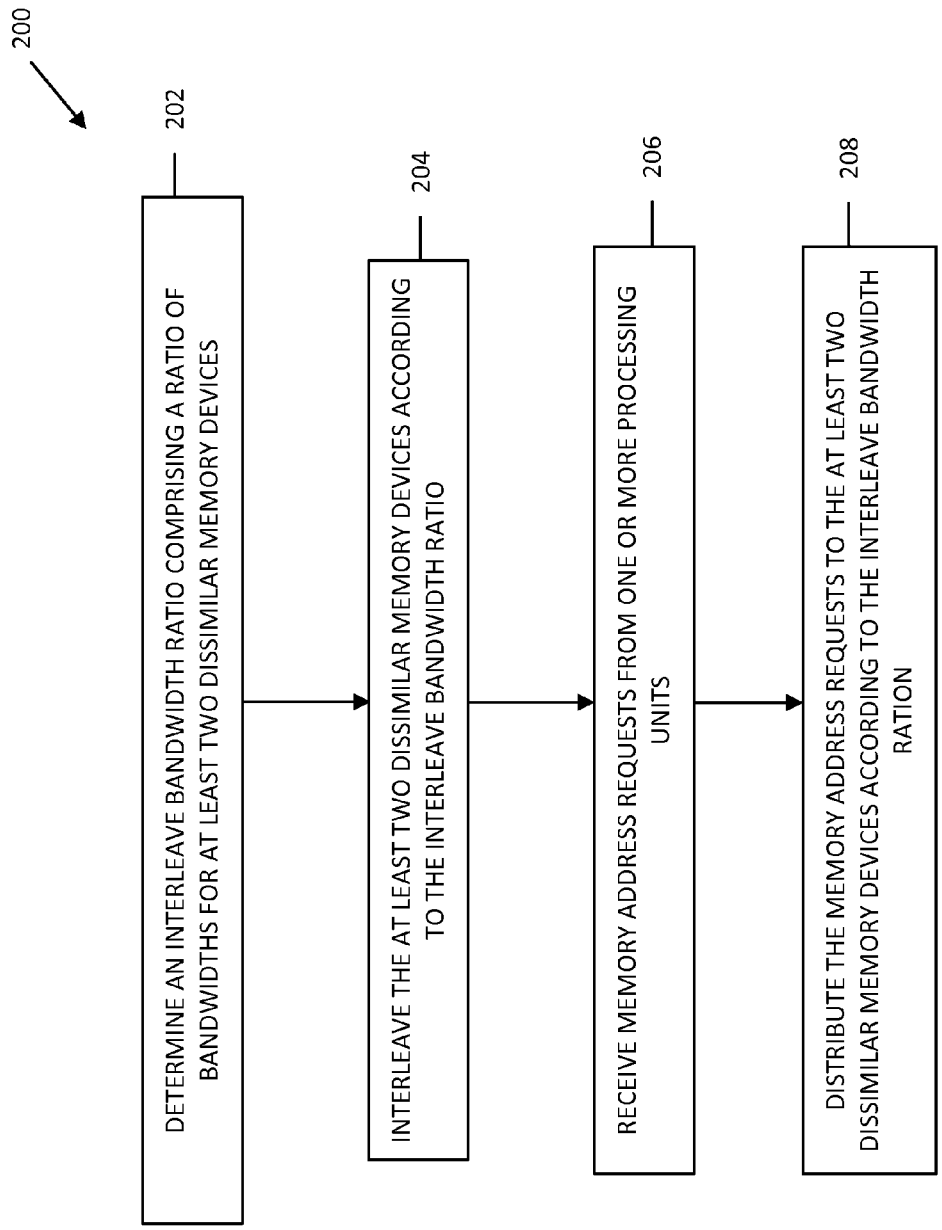
FIG. 2 is a flowchart of an embodiment of a method performed by the memory channel optimization module in FIG. 1 for managing dissimilar memory devices.

FIG. 2 illustrates a method 200 executed by the memory channel optimization module 102 for implementing the unified mode of operation by interleaving the dissimilar memory devices (e.g., DRAM devices 104a and 104b). At block 202, the memory channel optimization module 102 determines an interleave bandwidth ratio comprising a ratio of the data bandwidths for the DRAM devices 104a and 104b. The data bandwidths may be determined upon boot-up of the computing device.

Figure 3:
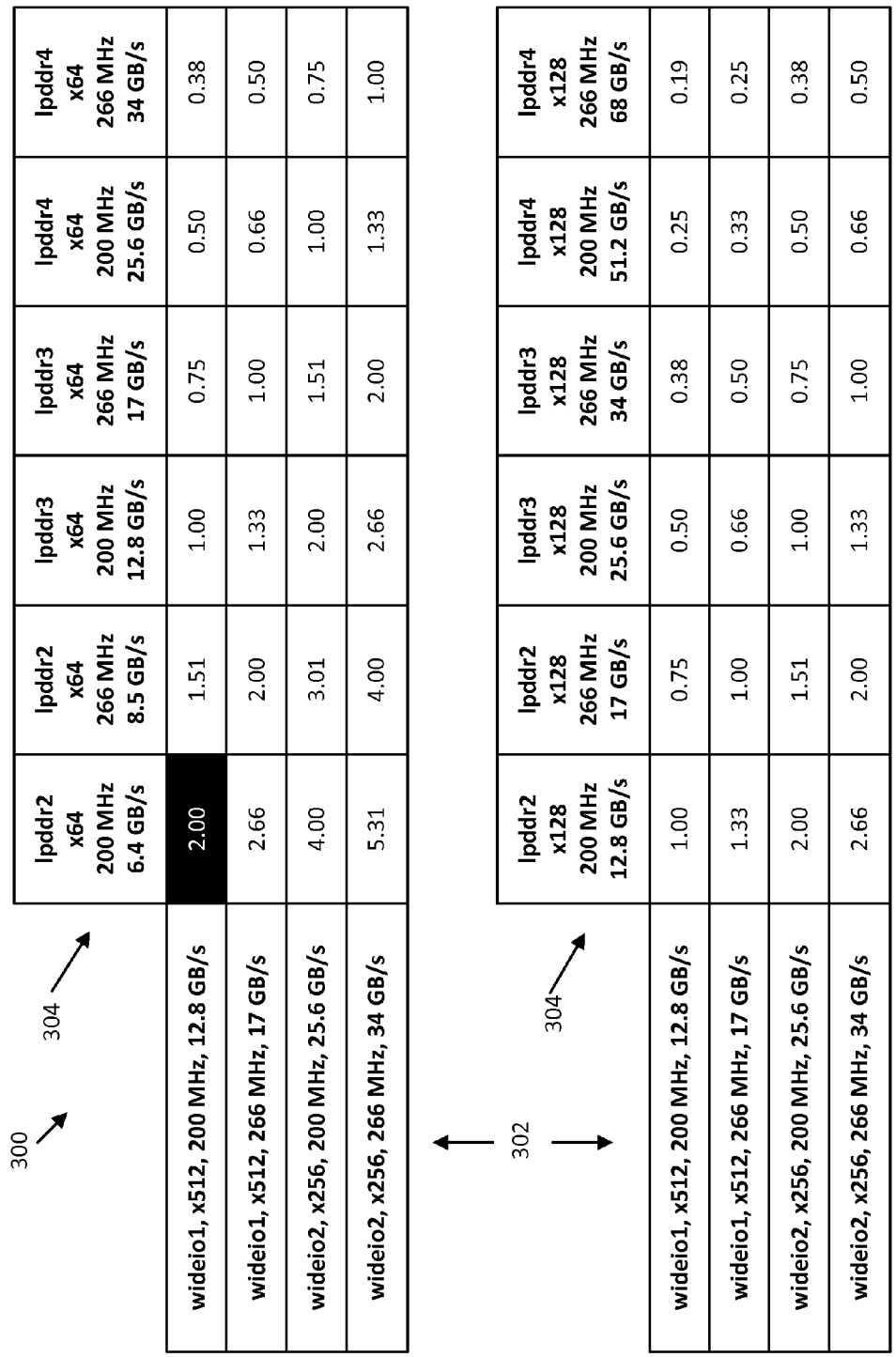
FIG. 3 is an exemplary table illustrating an interleave bandwidth ratio for various types of dissimilar memory devices.

In an embodiment, the interleave bandwidth ratio may be determined by accessing a data structure, such as, table 300 illustrated in FIG. 1. Table 300 identifies interleave bandwidth ratios for various combinations of types of dissimilar memory devices for implementing the two DRAM devices 104a and 104b. Columns 302 list various configurations for the DRAM device 104a. Rows 304 list various configurations for the DRAM device 104b. In this regard, each numerical data field identifies the interleave bandwidth ratio for the corresponding configuration row/column configuration. For example, the first data field in the upper portion of table 300 is highlighted in black and lists an interleave bandwidth ratio of 2.00, which corresponds to a bandwidth of 12.8 GB/s for the DRAM device 104a and a data bandwidth of 6.4 GB/s for the DRAM device 104b. In FIG. 3, the DRAM devices 104a and 104b are optimized for use in a mobile computing system. DRAM device 104b comprises a low power double data rate (LPDDR) memory device, which may be conventionally optimized for use in the discrete mode for dedicated use by the CPU 108. The DRAM device 104a comprises a Wide I/O (Wide IO) memory device, which may be conventionally optimized for use in the discrete mode for dedicated use by the GPU 106. In this regard, the numerical values identify the interleave bandwidth ratios for DRAM devices 104a and 104b according to variable performance parameters, such as, the memory address bit size (x64, x128, x256, x512), clock speed (MHz), and data bandwidth (GB/s). The memory channel optimization module 102 may perform a look-up to obtain the interleave bandwidth ratio associated with the DRAM devices 104a and 104b. At block 202 in FIG. 2, the memory channel optimization module 102 may also determine the numerical data bandwidths (e.g., from a table 300 or directly from the DRAM devices 104a and 104b) and then use this data to calculate the interleave bandwidth ratio.

It should be appreciated that the types of memory devices and performance parameters may be varied depending on the particular type of computing device, system applications, etc. in which the system 100 is being implemented. The example types and performance parameters illustrated in FIG. 3 are merely used in this description to describe an exemplary interleaving method performed by the memory channel optimization module 102 in a mobile system. Some examples of other random access memory technologies suitable for the channel optimization module 102 include NOR FLASH, EEPROM, EPROM, DDR-NVM, PSRAM, SRAM, PROM, and ROM. One of ordinary skill in the art will readily appreciate that various alternative interleaving schemes and methods may be performed.

Referring again to FIG. 2, at block 204, the memory channel optimization module 102 interleaves the DRAM devices 104a and 104b according to the interleave bandwidth ratio determined in block 202. The interleaving process matches traffic to each of the memory channels 114a, 114b, 114c, 114d and 118a and 118b for DRAM devices 104a and 104b, respectively, to the particular channel's available bandwidth. For example, if the DRAM device 104a has a data bandwidth of 34 GB/s and the DRAM device 104b has a data bandwidth of 17 GB/s, the interleave bandwidth ratio is 2:1. This means that the data rate of the DRAM device 104a is twice as fast as the data rate of the DRAM device 104b.

Figure 4:
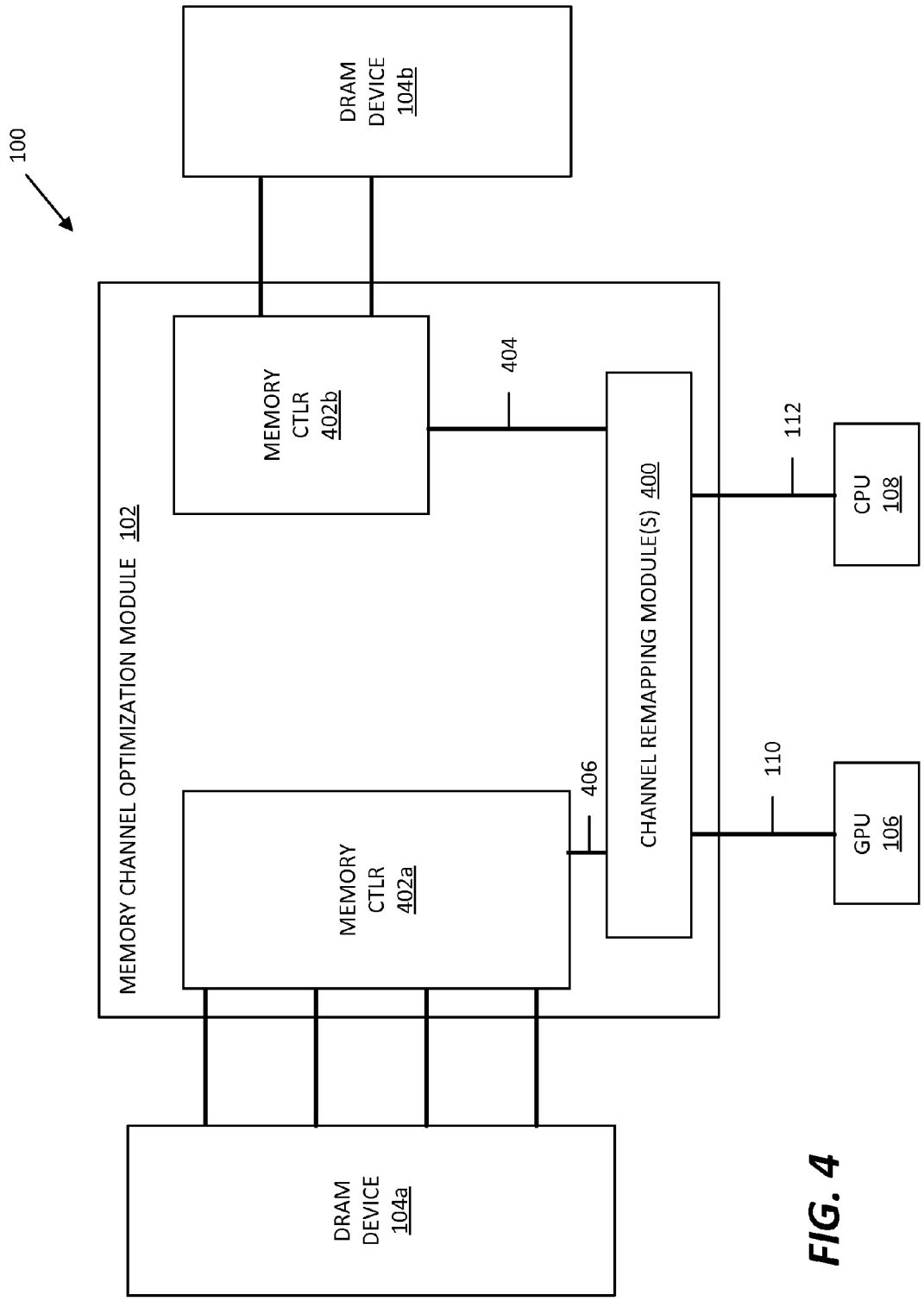
FIG. 4 is a block diagram illustrating components of the memory channel optimization module of FIG. 1.

As illustrated in FIG. 4, the memory channel optimization module 102 may comprise one or more channel remapping module(s) 400 for configuring and maintaining a virtual address mapping table for DRAM devices 104a and 104b according to the interleave bandwidth ratio and distributing traffic to the DRAM devices 104a and 104b according to the interleave bandwidth ratio. An exemplary address mapping table 500 is illustrated in FIG. 5. Address mapping table 500 comprises a list of address blocks 502 (which may be of any size) with corresponding channel and/or memory device assignments based on the interleave bandwidth ratio. For example, in FIG. 5, column 504 illustrates an alternating assignment between DRAM device 104a ("wideio2") and DRAM device 104b ("lpddr3e") based on an interleave bandwidth ratio of 1:1. Even numbered address blocks (N, N+2, N+4, N+6, etc.) are assigned to wideio2, and odd numbered address blocks (N+1, N+3, N+5, etc.) are assigned to lpddr3e.

Column 506 illustrates another assignment for an interleave bandwidth ratio of 2:1. Where DRAM device 104a ("wideio2") has a rate twice as fast as DRAM device 104b ("lpddr3e), two consecutive address blocks are assigned to wideio2 for every one address block assigned to lpddr3e. For example, address blocks N and N+1 are assigned to wideio2. Block N+2 is assigned to lppdr3e. Blocks N+3 and N+4 are assigned to wideio2, and so on. Column 508 illustrates another assignment for an interleave bandwidth ration of 1:2 in which the assignment scheme is reversed because the DRAM device 104b ("lpddr3e") is twice as fast as DRAM device 104a ("wideio2").

Figure 6:
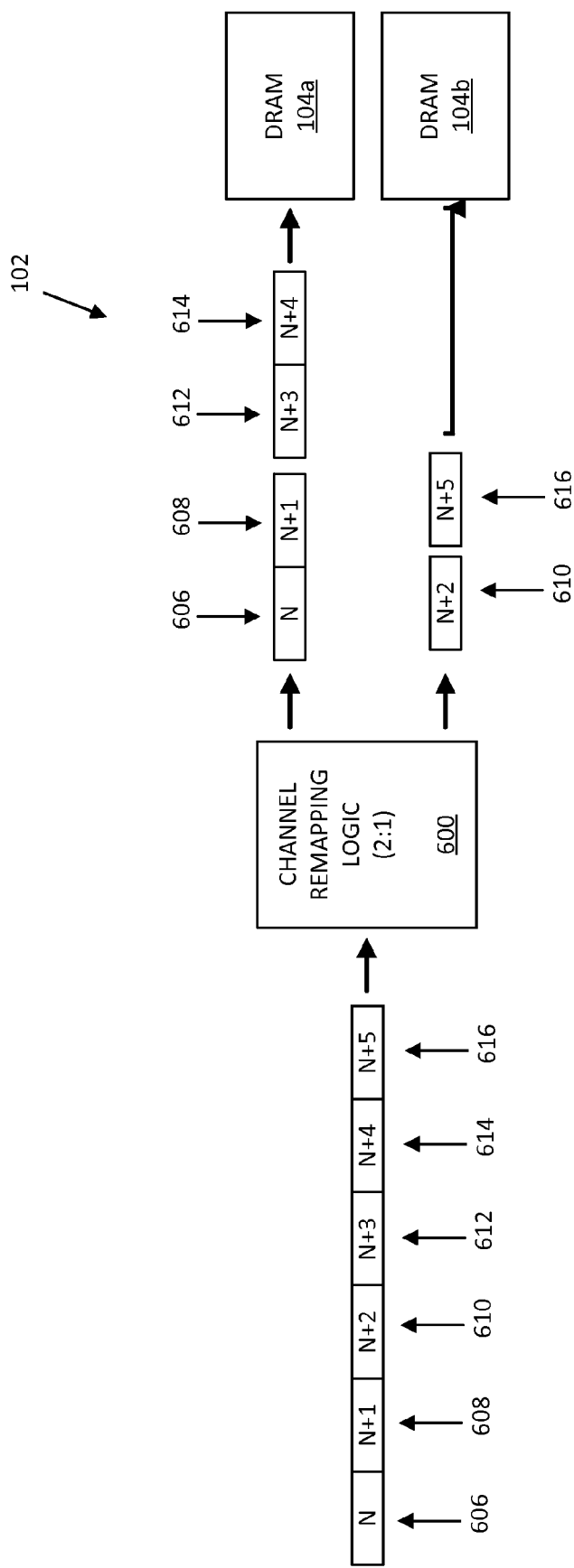
FIG. 6 is a combined flow/block diagram illustrating the general operation, architecture, and functionality of an embodiment of the channel remapping module of FIG. 4

Referring again to the flowchart of FIG. 2, at block 206, the GPU 106 and CPU 108 may access the interleaved memory, in a conventional manner, by sending memory address requests to the memory channel optimization module 102. As illustrated in FIG. 6, traffic may be received by channel remapping logic 600 as an input stream of requests 606, 608, 610, 612, 614, 616, etc. corresponding to address blocks N, N+1, N+2, N+3, N+4, N+5, etc. (FIG. 5). The channel remapping logic 600 is configured to distribute (block 208—FIG. 2) the traffic to the DRAM devices 104a and 104b according to the interleave bandwidth ratio and the appropriate assignment scheme contained in address mapping table 500 (e.g., columns 504, 506, 508, etc.).

Following the above example of a 2:1 interleave bandwidth ratio, the channel remapping logic 600 steers the requests 606, 608, 610, 612, 614, and 616 as illustrated in FIG. 6. Requests 606, 608, 612, and 614 for address blocks N, N+1, N+3, and N+4, respectively, may be steered to DRAM device 104a. Requests 610 and 616 for address blocks N+2, and N+5, respectively, may be steered to DRAM device 104b. In this manner, the incoming traffic from the GPU 106 and the CPU 108 may be optimally matched to the available bandwidth on any of the memory channels 114 for DRAM device 104a and/or the memory channels 118 for DRAM device 104b. This unified mode of operation enables the GPU 106 and the CPU 108 to individually and/or collectively access the combined bandwidth of the dissimilar memory devices rather than being limited to the "localized" high performance operation of the conventional discrete mode of operation.

Figure 7:
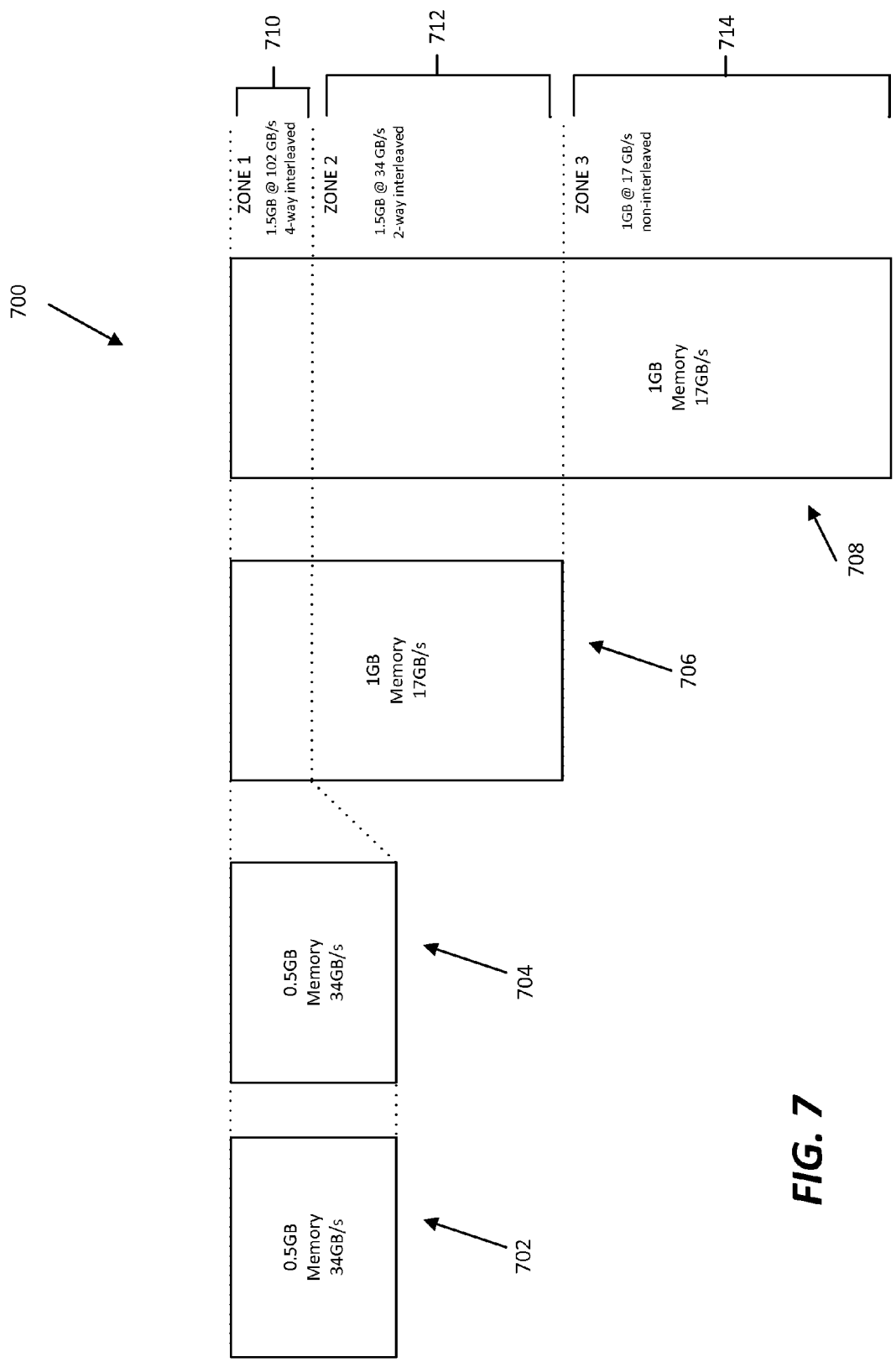
FIG. 7 is a diagram illustrating an embodiment of an interleave method for creating multiple logical zones across dissimilar memory devices.

As mentioned above, the memory channel optimization module 102 may be configured to selectively enable either the unified mode or the discrete mode based on various desirable use scenarios, system settings, etc. Furthermore, it should be appreciated that portions of the dissimilar memory devices may be interleaved rather than interleaving the entire memory devices. FIG. 7 illustrates a multi-layer interleave technique that may be implemented by memory channel optimization module 102 to create multiple "logical" devices or zones. Following the above example using a 2:1 interleave bandwidth ratio, the DRAM device 104a may comprise a pair of 0.5 GB memory devices 702 and 704 having a high performance bandwidth of 34 GB/s conventionally optimized for GPU 106. DRAM device 104b may comprise a 1 GB memory device 706 and a 2 GB memory device 708 each having a lower bandwidth of 17 GB/s conventionally optimized for CPU 108. The multi-layer interleave technique may create two interleaved zones 710 and 712 and a non-interleaved zone 714. Zone 710 may be 4-way interleaved to provide a combined 1.5 GB at a combined bandwidth of 102 GB/s. Zone 712 may be 2-way interleaved to provide a combined 1.5 GB at 34 GB/s/Zone 714 may be non-interleaved to provide 1 GB at 17 GB/s. The multi-layer interleaving technique combined with the memory management architecture of system 100 may facilitate transitioning between interleaved and non-interleaved portions because the contents of interleaved zones 710 and 712 may be explicitly designated for evictable or migratable data structures and buffers, whereas the contents of non-interleaved zone 714 may be designated for processing, such as, kernel operations and/or other low memory processes.

Figure 8:
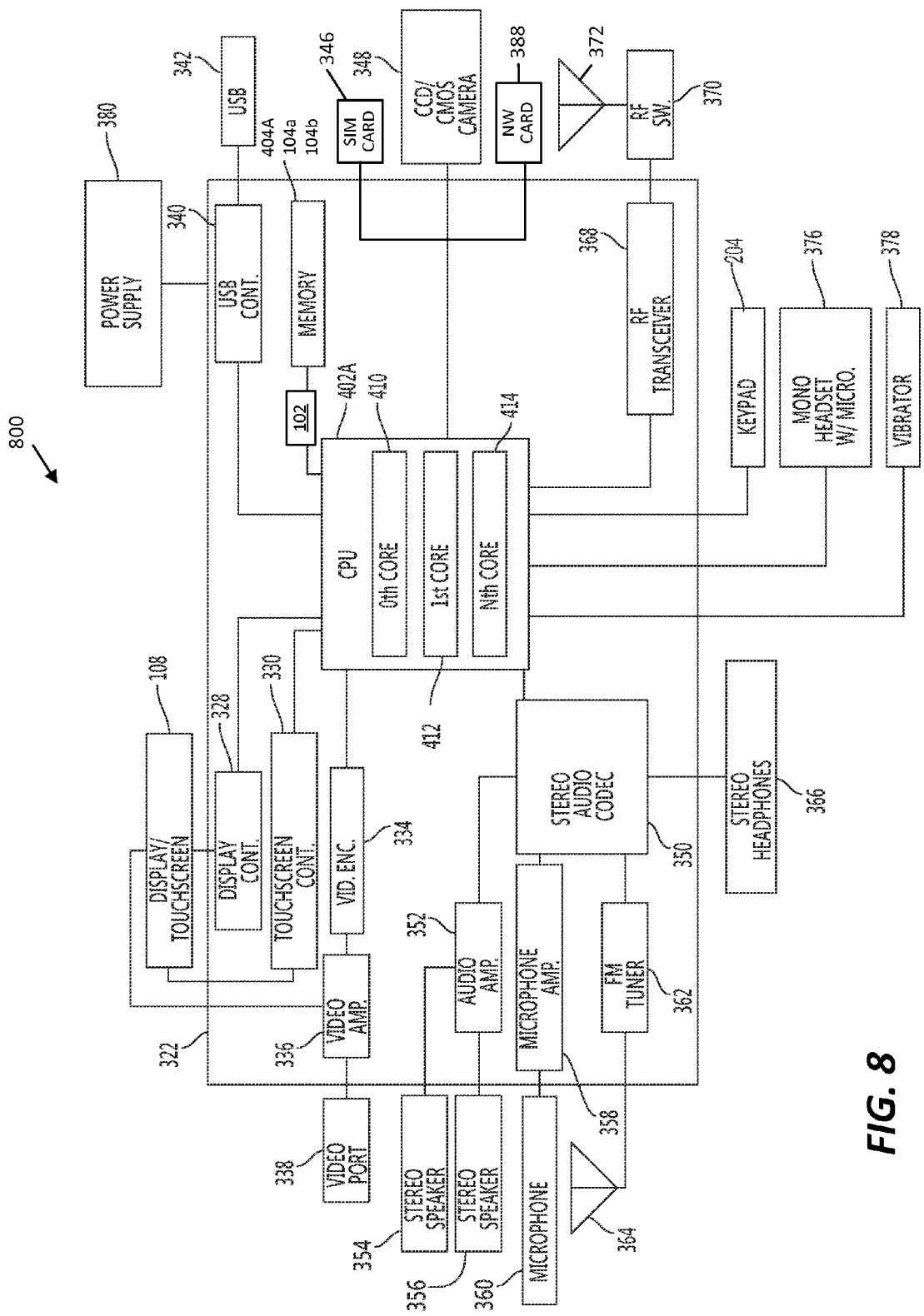
FIG. 8 is a block diagram illustrating an exemplary implementation of the memory channel optimization module in a portable computing device.

As mentioned above, the memory channel optimization module 102 may be incorporated into any desirable computing system. FIG. 8 illustrates the memory channel optimization module 102 incorporated in an exemplary portable computing device (PCD) 800. The memory optimization module 102 may comprise a system-on-a-chip (SoC) or an embedded system that may be separately manufactured and incorporated into designs for the portable computing device 800.

As shown, the PCD 800 includes an on-chip system 322 that includes a multicore CPU 402A. The multicore CPU 402A may include a zeroth core 410, a first core 412, and an Nth core 414. One of the cores may comprise, for example, the GPU 106 with one or more of the others comprising CPU 108. According to alternate exemplary embodiments, the CPU 402 may also comprise those of single core types and not one which has multiple cores, in which case the CPU 108 and the GPU 106 may be dedicated processors, as illustrated in system 100.

A display controller 328 and a touch screen controller 330 may be coupled to the GPU 106. In turn, the touch screen display 108 external to the on-chip system 322 may be coupled to the display controller 328 and the touch screen controller 330.

FIG. 8 further shows that a video encoder 334, e.g., a phase alternating line (PAL) encoder, a sequential color a memoire (SECAM) encoder, or a national television system(s) committee (NTSC) encoder, is coupled to the multicore CPU 402A. Further, a video amplifier 336 is coupled to the video encoder 334 and the touch screen display 108. Also, a video port 338 is coupled to the video amplifier 336. As shown in FIG. 8, a universal serial bus (USB) controller 340 is coupled to the multicore CPU 402A. Also, a USB port 342 is coupled to the USB controller 340. Memory 404A and a subscriber identity module (SIM) card 346 may also be coupled to the multicore CPU 402A. Memory 404A may comprise two or more dissimilar memory devices (e.g., DRAM devices 104a and 104b), as described above. The memory channel optimization module 102 may be coupled to the CPU 402A (including, for example, a CPU 108 and GPU 106) and the memory 404A may comprise two or more dissimilar memory devices. The memory channel optimization module 102 may be incorporated as a separate system-on-a-chip (SoC) or as a component of SoC 322.

Further, as shown in FIG. 8, a digital camera 348 may be coupled to the multicore CPU 402A. In an exemplary aspect, the digital camera 348 is a charge-coupled device (CCD) camera or a complementary metal-oxide semiconductor (CMOS) camera.

As further illustrated in FIG. 8, a stereo audio coder-decoder (CODEC) 350 may be coupled to the multicore CPU 402A. Moreover, an audio amplifier 352 may coupled to the stereo audio CODEC 350. In an exemplary aspect, a first stereo speaker 354 and a second stereo speaker 356 are coupled to the audio amplifier 352. FIG. 8 shows that a microphone amplifier 358 may be also coupled to the stereo audio CODEC 350. Additionally, a microphone 360 may be coupled to the microphone amplifier 358. In a particular aspect, a frequency modulation (FM) radio tuner 362 may be coupled to the stereo audio CODEC 350. Also, an FM antenna 364 is coupled to the FM radio tuner 362. Further, stereo headphones 366 may be coupled to the stereo audio CODEC 350.

FIG. 8 further illustrates that a radio frequency (RF) transceiver 368 may be coupled to the multicore CPU 402A. An RF switch 370 may be coupled to the RF transceiver 368 and an RF antenna 372. As shown in FIG. 8, a keypad 204 may be coupled to the multicore CPU 402A. Also, a mono headset with a microphone 376 may be coupled to the multicore CPU 402A. Further, a vibrator device 378 may be coupled to the multicore CPU 402A.

FIG. 8 also shows that a power supply 380 may be coupled to the on-chip system 322. In a particular aspect, the power supply 380 is a direct current (DC) power supply that provides power to the various components of the PCD 800 that require power. Further, in a particular aspect, the power supply is a rechargeable DC battery or a DC power supply that is derived from an alternating current (AC) to DC transformer that is connected to an AC power source.

FIG. 8 further indicates that the PCD 800 may also include a network card 388 that may be used to access a data network, e.g., a local area network, a personal area network, or any other network. The network card 388 may be a Bluetooth network card, a WiFi network card, a personal area network (PAN) card, a personal area network ultra-low-power technology (PeANUT) network card, or any other network card well known in the art. Further, the network card 388 may be incorporated into a chip, i.e., the network card 388 may be a full solution in a chip, and may not be a separate network card 388.

As depicted in FIG. 8, the touch screen display 108, the video port 338, the USB port 342, the camera 348, the first stereo speaker 354, the second stereo speaker 356, the microphone 360, the FM antenna 364, the stereo headphones 366, the RF switch 370, the RF antenna 372, the keypad 374, the mono headset 376, the vibrator 378, and the power supply 380 may be external to the on-chip system 322.

In a particular aspect, one or more of the method steps described herein may be stored in the memory 404A as computer program instructions, such as the modules described above in connection with the memory channel optimization module 102 as illustrated in FIG. 1.

These instructions may be executed by the multicore CPU 402A in combination or in concert with the memory channel optimization module 102 to perform the methods described herein. Further, the multicore CPU 402A, the memory channel optimization module 102, and memory 404A of the PCD 800, or a combination thereof may serve as a means for executing one or more of the method steps described herein.

Certain steps in the processes or process flows described in this specification naturally precede others for the invention to function as described. However, the invention is not limited to the order of the steps described if such order or sequence does not alter the functionality of the invention. That is, it is recognized that some steps may performed before, after, or parallel (substantially simultaneously with) other steps without departing from the scope and spirit of the invention. In some instances, certain steps may be omitted or not performed without departing from the invention. Further, words such as "thereafter", "then", "next", etc. are not intended to limit the order of the steps. These words are simply used to guide the reader through the description of the exemplary method.

Additionally, one of ordinary skill in programming is able to write computer code or identify appropriate hardware and/or circuits to implement the disclosed invention without difficulty based on the flow charts and associated description in this specification, for example.

Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the Figures which may illustrate various process flows.

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium.

Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of computer-readable media.

Alternative embodiments for the method 200 and the system 100 for managing dissimilar memory devices will become apparent to one of ordinary skill in the art to which the invention pertains without departing from its spirit and scope. Therefore, although selected aspects have been illustrated and described in detail, it will be understood that various substitutions and alterations may be made therein without departing from the spirit and scope of the present invention, as defined by the following claims.

What is claimed is:

1. A method for interleaving dissimilar memory devices, the method comprising:
   determining an interleave bandwidth ratio comprising a ratio of bandwidths for two or more of the dissimilar memory devices;
   interleaving the dissimilar memory devices according to the interleave bandwidth ratio; and
   distributing memory address requests from one or more processing units to the dissimilar memory devices according to the interleave bandwidth ratio.

2. The method of claim 1, wherein the one or more processing units comprise a central processing unit and a graphics processing unit.

3. The method of claim 1, wherein the dissimilar memory devices comprise a first type of dynamic random access memory (DRAM) and a second type of DRAM.

4. The method of claim 3, wherein the first type of DRAM comprises a double data rate memory and the second type of DRAM comprises a graphic double data rate memory.

5. The method of claim 1, wherein the dissimilar memory devices comprise a low power double data rate (LPDDR) memory and a wide I/O memory.

6. A system for interleaving dissimilar memory devices comprising:
   means for determining an interleave bandwidth ratio comprising a ratio of bandwidths for two or more of the dissimilar memory devices;
   means for interleaving the dissimilar memory devices according to the interleave bandwidth ratio; and
   means for distributing memory address requests from one or more processing units to the dissimilar memory devices according to the interleave bandwidth ratio, wherein the means for determining, the means for interleaving and the means for distributing comprise hardware.

7. The system of claim 6, wherein the one or more processing units comprise a central processing unit and a graphics processing unit.

8. The system of claim 6, wherein the dissimilar memory devices comprise a first type of dynamic random access memory (DRAM) and a second type of DRAM.

9. The system of claim 8, wherein the first type of DRAM comprises a double data rate memory and the second type of DRAM comprises a graphic double data rate memory.

10. The system of claim 6, wherein the dissimilar memory devices comprise a low power double data rate (LPDDR) memory and a wide I/O memory.

11. A memory system for managing memory devices in a computer system, the memory system comprising:
    a first type of memory device assigned to a first client;
    a second type of memory device assigned to a second client; and
    a memory channel optimization module in communication with the first and second types of memory devices and the first and second clients, the memory channel optimization module operable in a unified mode of operation to interleave the first and second types of memory devices by:
       determining an interleave bandwidth ratio comprising a ratio of bandwidths for the first type of memory device and the second type of memory device;
       interleaving the first and second types of memory devices according to the interleave bandwidth ratio; and
       distributing memory address requests from the first and second clients to the first and second types of memory devices according to the interleave bandwidth ratio.

12. The memory system of claim 11, wherein the first client comprises a central processing unit and the second client comprises a graphics processing unit.

13. The memory system of claim 11, wherein the first type of memory device comprises a double data rate memory and the second type of memory device comprises a graphic double data rate memory.

14. The memory system of claim 11, wherein the first type of memory device comprises a low power double data rate (LPDDR) memory and the second type of memory device comprises a wide I/O memory.

15. The memory system of claim 11, wherein the memory channel optimization module is further operable in a discrete mode of operation in which the first type of memory device manages data specific to the first client and the second type of memory device manages data specific to the second client.

16. A computer program product comprising a non-transitory computer usable medium having a computer readable program code embodied therein, the computer readable program code adapted to be executed to implement a method for interleaving dissimilar memory devices, the method comprising:
    determining an interleave bandwidth ratio comprising a ratio of bandwidths for two or more of the dissimilar memory devices;
    interleaving the dissimilar memory devices according to the interleave bandwidth ratio; and
    distributing memory address requests from one or more processing units to the dissimilar memory devices according to the interleave bandwidth ratio.

17. The computer program product of claim 16, wherein the one or more processing units comprise a central processing unit and a graphics processing unit.

18. The computer program product of claim 16, wherein the dissimilar memory devices comprise a first type of dynamic random access memory (DRAM) and a second type of DRAM.

19. The computer program product of claim 18, wherein the first type of DRAM comprises a double data rate memory and the second type of DRAM comprises a graphic double data rate memory.

20. The computer program product of claim 16, wherein the dissimilar memory devices comprise a low power double data rate (LPDDR) memory and a wide I/O memory.

21. A system for interleaving dissimilar memory devices, the system comprising:

means for determining an interleave bandwidth ratio comprising a ratio of bandwidths for two or more of the dissimilar memory devices;

means for interleaving the dissimilar memory devices according to the interleave bandwidth ratio; and means for distributing memory address requests from one or more processing units to the dissimilar memory devices according to the interleave bandwidth ratio, wherein the means for determining, the means for interleaving and the means for distributing comprise a non-transitory computer readable medium.

22. The system of claim 21, wherein the one or more processing units comprise a central processing unit and a graphics processing unit.

23. The system of claim 21, wherein the dissimilar memory devices comprise a first type of dynamic random access memory (DRAM) and a second type of DRAM.

24. The system of claim 23, wherein the first type of DRAM comprises a double data rate memory and the second type of DRAM comprises a graphic double data rate memory.

25. The system of claim 21, wherein the dissimilar memory devices comprise a low power double data rate (LPDDR) memory and a wide I/O memory.

* * * * *